UNITED STATES PATENT OFFICE.

ROBERT MUSHET, OF CHELTENHAM, ENGLAND.

IMPROVEMENT IN THE MANUFACTURE OF STEEL, &c.

Specification forming part of Letters Patent No. 49,487, dated August 15, 1865.

*To all whom it may concern:*

Be it known that I, ROBERT MUSHET, of Cheltenham, in the county of Gloucester, England, have invented certain new and useful Improvements in the Manufacture of Cast-Steel, Cast Semi-steel, and Cast Homogeneous Iron; and I do hereby declare that the following is a full and exact description thereof.

My invention consists in producing a superior quality of cast-steel, cast semi-steel, or cast homogeneous iron by melting any material or any mixture or mixtures of materials which, when melted, produce cast-steel, cast semi-steel, or cast homogeneous iron, together with carbonaceous matter and ores or oxides of titanium, including such ores of titanium as are simple oxides of titanium or double oxides of titanium and iron, and including titanic acid or oxides of titanium artificially prepared from minerals containing titanium, including likewise ores and oxides of titanium, whether simple or compound, which have been deoxidized or partially deoxidized before use.

I prefer to carry my invention into effect in the manner hereinafter explained; but I do not limit myself thereto, as the method of carrying my invention into effect may be varied without departing from the nature of my invention.

I introduce the material or the mixture of materials which it is intended to melt into cast-steel, cast semi-steel, or cast homogeneous iron, the carbonaceous matter, and the ore or oxide of titanium, whether simple or compound, into a melting-pot or crucible such as is ordinarily used by steel-melters, and which is placed in an ordinary steel-melting furnace. I heat the said substances together in the melting-pot until they have reacted upon one another and entered into fusion producing steel, semi-steel, or homogeneous iron, and I then pour the fluid metal into suitable ingot-molds or other molds.

In carrying my invention into effect I use simple ores of titanium—such as rutile and anataic—or a compound ore of titanium, such as ilmenite; but other ores of titanium, whether simple or compound, may be employed. In practice, however, I found that ilmenite is a very economical ore to make use of, and affords very uniform and excellent results, and the best ilmenite with which I am at the present time acquainted is that found near Egersund, on the coast of Norway, an analysis of which by Professor Rose, of Berlin, gives as under:

| | |
|---|---|
| Titanic acid | 43.73 parts. |
| Red oxide of iron | 42.70 " |
| Protoxide of iron | 13.57 " |
| | 100.00 " |

Therefore, though I claim the use of titanium ores and oxides, simple and compound, natural or artificial, deoxidized or partially deoxidised, I shall confine myself to describing my process as carried into effect with the compound titanium ore called "ilmenite," which is abundant, cheap, and very pure. When, instead of ilmenite, I use any other compound of titanium, the manufacture is conducted in the way I have described, excepting that the ilmenite is replaced by the other titanium compound.

I prepare the ilmenite for my process by breaking, stamping, or crushing it so as to pass through a riddle of ten meshes per linear or one hundred meshes per square inch; but I do not at all limit myself to this method of preparing the ilmenite, for it may be crushed smaller or not crushed at all, but merely broken into small pieces; but I have found that very excellent results are obtained when the ilmenite is prepared as I have hereinbefore described.

The carbonaceous matter I prefer to employ is wood-charcoal, and preferably that prepared from oak; but other charcoal may be advantageously employed, and other carbonaceous matters, such as pitch, resin, animal-carbon free from phosphate of lime, prepared, for instance, from leather scraps, and charcoal prepared from woods other than oak. I keep the charcoal in a dry room or store free from damp and wet, in order that a given weight of the said charcoal may at all times contain nearly the same weight of carbon. I prepare the charcoal for my process by breaking it into small pieces, from the size of a large pea up to the size of a bean, or larger; but I do not confine myself to any particular size of the said pieces, observing, however, that I find it best to exclude all the dust and very small pieces of charcoal, as they tend to affect the uniformity of the results obtained in those cases where they are employed.

The material I employ as the basis of the manufacture of cast-steel, semi-cast steel, or cast homogeneous iron, according to my invention, may be any material or mixtures of materials which, when melted, will produce cast-steel, cast semi-steel, or homogeneous, iron as the case may be. I find wrought or malleable iron an excellent and cheap material, and I prepare it for my process by cutting it up by means of shears into pieces of a size most convenient for packing into the melting-pots, so as to economize the space in the said pots as much as possible.

The bar or wrought iron which I prefer to employ for best qualities of steel is good charcoal bar-iron—such, for instance, as common Swede bar-iron or American charcoal bar-iron; but for second and third class steels a mixture of charcoal bar-iron with common bar-iron or common puddled bars may be employed; but I prefer to use such bar or wrought iron as is not injuriously contaminated with sulphur or phosphorus, as these impurities are apt to cause the ingots of cast-steel, semi-cast-steel, or cast homogeneous iron to crack when heated and rolled or hammered. I employ also as a flux oxide of manganese, which is commonly used in the manufacture of cast-steel, cast semi-steel, or cast homogeneous iron; but the use of the oxide of manganese as a flux forms no part of my invention.

The pots I prefer to use and the furnaces in which they are placed and heated are such as are generally used by manufacturers of cast-steel.

I now proceed to illustrate my process by a few examples and explanatory remarks.

Example No. 1: I take good Swede bar-iron worth twelve pounds per ton, (cut small,) forty pounds; prepared ilmenite, one pound; oak-charcoal, twelve ounces; oxide of manganese, (wrapped in paper,) six ounces. I introduce these materials into a melting-pot or crucible, placed in a steel melting-furnace, and I heat the said substances therein till the said substances have reacted upon each other and fusion has taken place. I then withdraw the melting-pot from the furnace and pour the melted metal into an ingot-mold or other suitable mold, as cast-steel, cast semi-steel, or cast homogeneous iron, as the case may be. I regulate the temper or hardness of the cast-steel, cast semi-steel, or homogeneous iron produced by varying the quantity of charcoal employed, the proportions of the other materials remaining the same. Thus, if I desire to produce a harder steel, I use thirteen ounces of charcoal; if still harder, fourteen ounces of charcoal, and so on; and if I wish to produce a softer steel, semi-steel, or homogeneous iron, I use eleven ounces of charcoal; if still softer, ten ounces of charcoal, and so on, observing that the greater the weight of the charcoal added to a given weight of materials intended to be melted into steel the harder will be the steel produced, and vice versa; and by varying the quantity of charcoal employed all the tempers of cast-steel, cast semi-steel, and homogeneous iron met with in commerce may be readily obtained. I do not limit myself to the proportions I have here set down of wrought-iron, ilmenite, charcoal, and manganese, for they may be varied without departing from the nature of my invention; but I have in practice obtained excellent results with the said proportions. In place of Swede iron in this example, American charcoal bar-iron may be employed, or a mixture of Swede and American bar-iron.

Example No. 2: Swede bar-iron, thirty pounds; scrap-steel of any kind, ten pounds; prepared ilmenite, one pound; charcoal, eleven ounces; oxide of manganese, (wrapped in paper,) six ounces. This I heat as in example No. 1, and regulate the temper in a similar manner. In this example American bar-iron, or a mixture of Swede and American bar-iron, may be used in place of Swede iron alone.

Example No. 3: Swede bar-iron, fifteen pounds; common bar-iron, fifteen pounds; steel-scrap of any kind, ten pounds; ilmenite prepared, one pound; charcoal, eleven ounces; oxide of manganese, (wrapped in paper,) six ounces.

Example No. 4: Common puddle-bars, thirty pounds; scrap-steel of any kind, ten pounds; ilmenite, prepared, one pound; charcoal, twelve ounces; oxide of manganese, (wrapped in paper,) six ounces.

Example No. 5: Blister-steel, bar-steel, puddled steel, Bessemer scrap or scrap-steel, or any mixture of these, forty pounds; ilmenite, one pound; charcoal, eight ounces; oxide of manganese, (wrapped in paper,) six ounces.

In these examples I proceed as in Example No. 1, and I regulate the temper of the cast-steel, semi-steel or cast homogeneous iron in a similar manner by varying the quantity of charcoal, the proportions of the other materials remaining the same. Nevertheless the proportions of the said other materials may be varied without departing from the nature of my invention.

In charging the materials into the melting-pots I am particularly careful that the whole of the charcoal shall be introduced into the melting-pots, for should any of it be lost by falling into the fire the temper of the steel will be softer than was intended, and the results will be more or less wanting in uniformity. I avoid also mixing the manganese with the ilmenite, as this causes injury to the insides of the melting-pots from the action of the slag that is formed. I therefore prefer to wrap the manganese in paper and drop it into the melting-pot, when the said melting-pot is charged about the center of the charge of materials.

Though I have here described my process when all the materials are simultaneously introduced into the melting-pot when first charged, the ilmenite, charcoal, and manganese may nevertheless be introduced, either together or separately, at a subsequent stage of the melting operation; but in practice I find it convenient and efficacious to introduce the whole of the said materials simultaneously into the melting-pot when it is charged at the commencement of the melting operation.

In place of oxide of manganese, or together with oxide of manganese, spiegeleisen or franklinite, pig-iron, or other irons may be introduced to give toughness and ductility to the cast-steel, cast semi-steel, or cast homogeneous iron, as the case may be, if required; but such additions form no part of my invention.

When ilmenite cannot be procured, iserine may be employed in place of ilminite; but the results with iserine are not so good as with ilmenite. Iserine is a magnetic ore of titanium and iron less rich in titanium than ilmenite. Ilmenite is non-magnetic from the large proportion of titanium which it contains.

Though I have herein described my invention as carried into effect when cast steel, cast semi-steel, or cast homogeneous iron are manufactured by melting the said substances in melting-pots placed and heated in ordinary steel melting-furnaces, my invention may be applied to cast-steel, cast semi-steel, or cast homogeneous iron manufactured and melted by other methods—as, for instance, by means of a pneumatic decarbonizing furnace or converter, or in a reverberatory or other furnace in which steel is treated and melted by means of gas.

Having thus declared the nature of my invention for the manufacture of an improved quality of cast-steel, cast semi-steel, or cast homogeneous iron, and some of the methods I employ to carry the said invention into effect, I now declare that

What I claim as my invention, and desire to secure by Letters Patent, consists in—

Melting materials or mixtures of materials which, when melted, produce cast-steel, cast semi-steel, or cast homogeneous iron, together with carbonaceous matter and simple or compound ores of titanium, oxide of titanium, or titanic acid, or other titanium compounds, or these substances deoxidized or partially deoxidized, in order to improve the quality of the said cast-steel, cast semi-steel, or homogeneous iron produced.

ROBT. MUSHET.

Witnesses:
EDWD. M. MUSHET,
    *Belgrave House, Cheltenham.*
THOMAS BOLLINGS,
    61 *Regent St. Cheltenham.*